(12) United States Patent
    Manikonda et al.

(10) Patent No.: US 11,295,230 B2
(45) Date of Patent: Apr. 5, 2022

(54) LEARNING PERSONALIZED ACTIONABLE DOMAIN MODELS

(71) Applicant: INTERNATIONAL BUSINESS MACHINES CORPORATION, Armonk, NY (US)

(72) Inventors: Lydia Manikonda, Tempe, AZ (US); Shirin Sohrabi Araghi, Port Chester, NY (US); Biplav Srivastava, Rye, NY (US); Kartik Talamadupula, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1406 days.

(21) Appl. No.: 15/475,551

(22) Filed: Mar. 31, 2017

(65) Prior Publication Data
    US 2018/0285770 A1    Oct. 4, 2018

(51) Int. Cl.
    *G06N 20/00*    (2019.01)
    *G06N 7/00*     (2006.01)
    *G06N 5/04*     (2006.01)
    *G06F 40/35*    (2020.01)
    G06Q 50/00     (2012.01)
    G06Q 30/04     (2012.01)

(52) U.S. Cl.
    CPC ............. *G06N 20/00* (2019.01); *G06F 40/35* (2020.01); *G06N 5/045* (2013.01); *G06N 7/005* (2013.01); *G06Q 30/04* (2013.01); *G06Q 50/01* (2013.01)

(58) Field of Classification Search
    CPC .......... G06N 20/00; G06N 5/045; G06N 7/05; G06F 40/35; G06Q 30/04; G06Q 50/01
    See application file for complete search history.

(56) References Cited

U.S. PATENT DOCUMENTS

| 2007/0005413 | A1* | 1/2007 | Hennings | G06Q 10/06311 |
| | | | | 705/7.13 |
| 2014/0278459 | A1 | 9/2014 | Morris | |
| 2014/0358828 | A1 | 12/2014 | Phillipps et al. | |
| 2015/0304368 | A1* | 10/2015 | Vaccari | H04W 4/027 |
| | | | | 709/206 |

(Continued)

OTHER PUBLICATIONS

Li, et al., "Learning Probabilistic Hierarchical Task Networks as Probabilistic Context-Free Grammars to Capture User Preferences", ACM Transactions on Intelligent Systems and Technology, vol. 5, No. 2, Article 29, Apr. 2014 (Year: 2014).*

(Continued)

*Primary Examiner* — Tsu-Chang Lee
(74) *Attorney, Agent, or Firm* — Griffiths & Seaton PLLC

(57) ABSTRACT

Embodiments for learning personalized actionable domain models by a processor. A domain model may be generated according to a plurality of actions, extracted from one or more online data sources, of a plurality of cluster representatives. The plurality of actions achieve a goal. A hierarchical action model may be generated based on probabilities of the domain model and the plurality of actions. The hierarchical action model comprises a sequence of actions of the plurality of actions for achieving the goal. The hierarchical action model may be personalized by filtering to a selected set of actions according to weighted actions of the plurality of actions.

20 Claims, 8 Drawing Sheets

(56) References Cited

U.S. PATENT DOCUMENTS

2016/0171063 A1    6/2016  Kiciman et al.

OTHER PUBLICATIONS

Kickman, et. al., "Towards decision support and goal achievement: Identifying action-outcome relationships from social media", KDD'15: Proceedings of the 21th ACM SIGKDD International Conference on Knowledge Discovery and Data Mining, Aug. 2015, pp. 547-556 (Year: 2015).*

Leacock, et. al., "Using Corpus Statistics and WorldNet Relations for Sense Identification", Computational Linguistics, Mar. 1998 (Year: 1998).*

\* cited by examiner

LEARNING PERSONALIZED ACTIONABLE DOMAIN MODELS

BACKGROUND OF THE INVENTION

Field of the Invention

The present invention relates in general to computing systems, and more particularly to, various embodiments for learning personalized actionable domain models by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. The increasing complexity of society, coupled with the evolution of technology continue to engender the sharing of a vast amount of information between people. For example, as social media and internet communities continue to grow, a wealth of user-generated data is accumulating on the Internet, and there is a growing interest in exploiting this data for a variety of reasons.

SUMMARY OF THE INVENTION

Various embodiments for learning personalized actionable domain models by a processor, are provided. In one embodiment, by way of example only, a method for learning personalized actionable domain models from online traces and social networks, again by a processor, is provided. A domain model may be generated according to a plurality of actions, extracted from one or more online data sources, of a plurality of cluster representatives. The plurality of actions achieve a goal. A hierarchical action model may be generated based on probabilities of the domain model and the plurality of actions. The hierarchical action model comprises a sequence of actions of the plurality of actions for achieving the goal. The hierarchical action model may be filtered to a selected set of actions according to weighted actions of the plurality of actions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
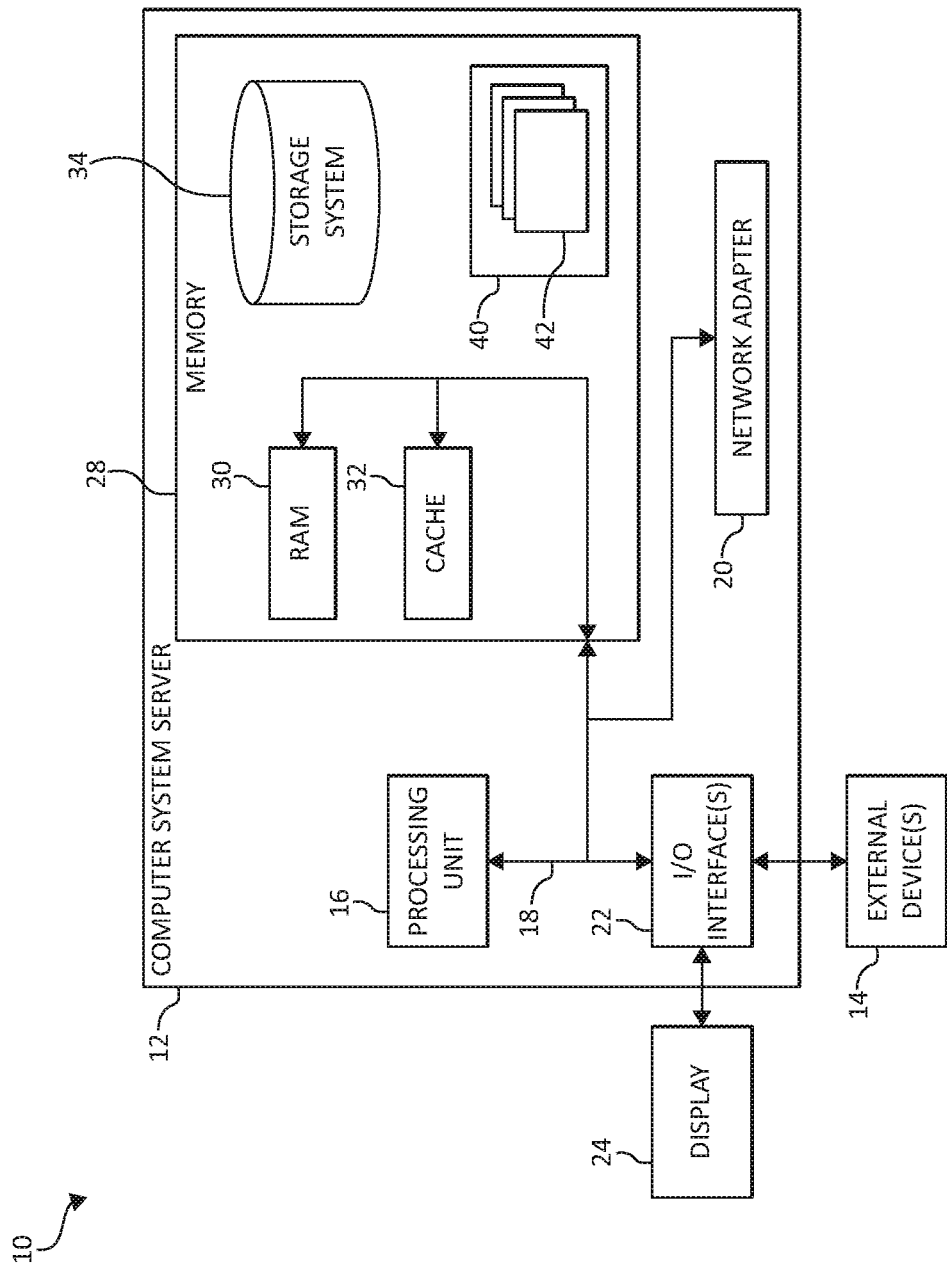
FIG. 1 is a block diagram depicting an exemplary computing node according to an embodiment of the present invention.

As social media and internet communities continue to grow, a wealth of user-generated data is accumulating on the Internet, and there is a growing interest in exploiting this data to provide data-based decision making using artificial intelligence (AI) planning systems. For example, there is increasing interest in support for complex scenarios that require planning and/or sequential decision making while simultaneously learning personalized actionable domain models from online traces and social networks.

An AI planning system can include a set of predicates (e.g., a set of fluents or facts), an initial state, a set of action operators (e.g., an action model that can include action names, action preconditions, action effects, and/or delete effects), and a goal condition. A combination of the predicates, the initial state, and the set of action operators can be referred to as a domain model. An action model can include an action sequence based on the domain model that if executed from the initial state, the resulting state achieves and/or contains the goal condition. Further, each action in the sequence of actions can have an associated cost, and a cost of the action model can be calculated by summing the cost of each action.

Applications that can utilize AI planning systems include, but are not limited to: diagnostic problem solving (e.g., trying to realize a fault or error), plan recognition (e.g., trying to infer the goals and/or plans of an agent), and/or explanation generation (e.g., trying to explain observations). However, conventional AI planning systems face several challenges and limitations. For example, it is not often the case that the data to be analyzed by the AI planning system is expressed in a structured form or in a planning domain definition language (PDDL). Thus, an expert in the data's domain is required to translate the data into PDDL (e.g., using tools such as, but not limited to: O-PLAN™, SIPE™, and/or GIPO™). Also, possible executions of the plans (e.g., plan tracers) that can be used to learn the data is often not available. Thus, AI planning systems have been limited to situations in which the full PDDL specification of the data description is given and/or the set of plan tracers is available.

Various embodiments of the present invention are directed to computer processing systems, computer-implemented methods, apparatuses and/or computer program products that can autonomously (e.g., with direct human guidance) establish AI domain models and/or action models from unstructured data to provide complex decision making plans to achieve a goal and also learn personalized actionable domain models from online traces and social networks. Example goals can include, but are not limited to: quitting smoking, traveling, sharing traveling plans, building conditioning to run a five kilometer distance, improving health, losing weight, planning a special event (e.g., a wedding), and passing a test. Numerous groups (e.g., self-help groups) exist on the Internet that share information regarding the accomplishment of a goal, such as, but not limited to: quitting smoking, losing weight, and/or world traveling. For instance, a given goal can be to quit smoking, and social media outlets can provide a plethora of user-generated data regarding user experiences, knowledge, and/or theories describing how to do so. In one or more embodiments described herein, user-generated data (e.g., text posts and/or commentary) can be analyzed to establish an action model, and a plan can be generated that can increase a likelihood of achieving a goal.

In order to facilitate generating decision-making plans based on unstructured data and learning personalized actionable domain models from online traces and social networks, one or more embodiments described herein can include analyzing data extracted from a domain in a global corpus (e.g., the Internet including one or more social media networks), establishing a sequence of actions, and generating one or more action models. In one or more embodiments, the data can include user commentary generated by one or more entities on one or more social media outlets on the Internet. The commentary can include one or more actions performed by one or more social media users which facilitates achievement of a goal. For example, the one or more actions can include a dietary schedule performed by one or more users to facilitate weight loss.

Additionally, one or more embodiments provide for learning personalized actionable domain models. A domain model may be generated according to a plurality of actions, extracted from one or more online data sources (e.g., extracted from a non-numerical language), of a plurality of cluster representatives. The plurality of actions achieve a goal. A hierarchical action model may be generated based on probabilities of the domain model and the plurality of actions. The hierarchical action model comprises a sequence of actions of the plurality of actions for achieving the goal. The hierarchical action model may be filtered to a selected set of actions according to weighted actions of the plurality of actions.

In an additional aspect, the present invention provides for generating action plan models for one or more users, by tracking online data/information (e.g., Internet, social media posts of a social network, and the like) containing similar action/activity data, along with preferences of other users present in a social media network of a user. More specifically, a corpus of online data may be collected and plan traces may be extracted that consist of activity traces of other users from the online sources. A hierarchal structure/model (e.g., a hierarchal task network "HTN" or probabilistic hierarchical task network "PHTN") may be generated based with probabilities of the action model and domain models. The extracted trace data and hierarchal model may be updated with preferences of other users in the user's social network by weighing social media data (e.g., "posts" or "tweets") of identified associates (e.g., family, friends, business associates of a user of a social media network) in the social media network having a defined social distance from the user as compared to those unidentified users (e.g., persons, strangers or those of a social media network that may not be linked, connected, associated, and/or networked to user). That is, identified associates may have social media data assigned a greater or higher weighted value of actions as compared to weighted value of actions of unidentified users of the social media graph. The hierarchical action model may be filtered to a subset of best/top-N set of abstract tasks/actions and verifying the model with one or more types of planners (e.g., HTN, probabilistic HTN), where N may be a predetermined value or positive integer. The so-called "best/top-N set of abstract tasks/actions" may be very subjective and context dependent. The best/top-N set of abstract tasks/actions may be interpreted and evaluated according to a plurality of actions, preference, and/or weighted actions or tasks. Also, machine learning models may be employed to assist in learning the best/top-N set of abstract tasks/actions.

For example, a set of plan traces, in natural language, of users performing some activities in a social media network may be used to produce a personalized domain model for a user that may include state variables (predicates) and actions. The social media network may include a person and a tiered set of other individuals. In one aspect, the social media network may be divided into a two-tier social media network set of similar users (e.g., "near" users, i.e., users having a social distance within a selected or defined distance) and dissimilar users (e.g., "far" users, i.e., other users having a social distance greater than a selected or defined distance) as related to a selected or identified user. A contact list of the social media network for a user may be parsed, searched, and/or analyzed to determine similar users as compared to dissimilar users. A learned model may be personalized for an individual/user and also be probabilistically weighted by the choices of others users (e.g. "near" and "far") in a social media network. An HTN can be interpreted as a hierarchical summary of traces, and probability is evidence of variations among social group.

As described herein, one or more machine learning models may be invoked and applied to learning personalized actionable domain models from online traces and social networks. In one aspect, the various functional units of a machine learning model component may apply one or more heuristics to one or more machine learning based models using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

In one aspect, any operation described herein for determining, estimating, and/or calculating, and/or generating may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
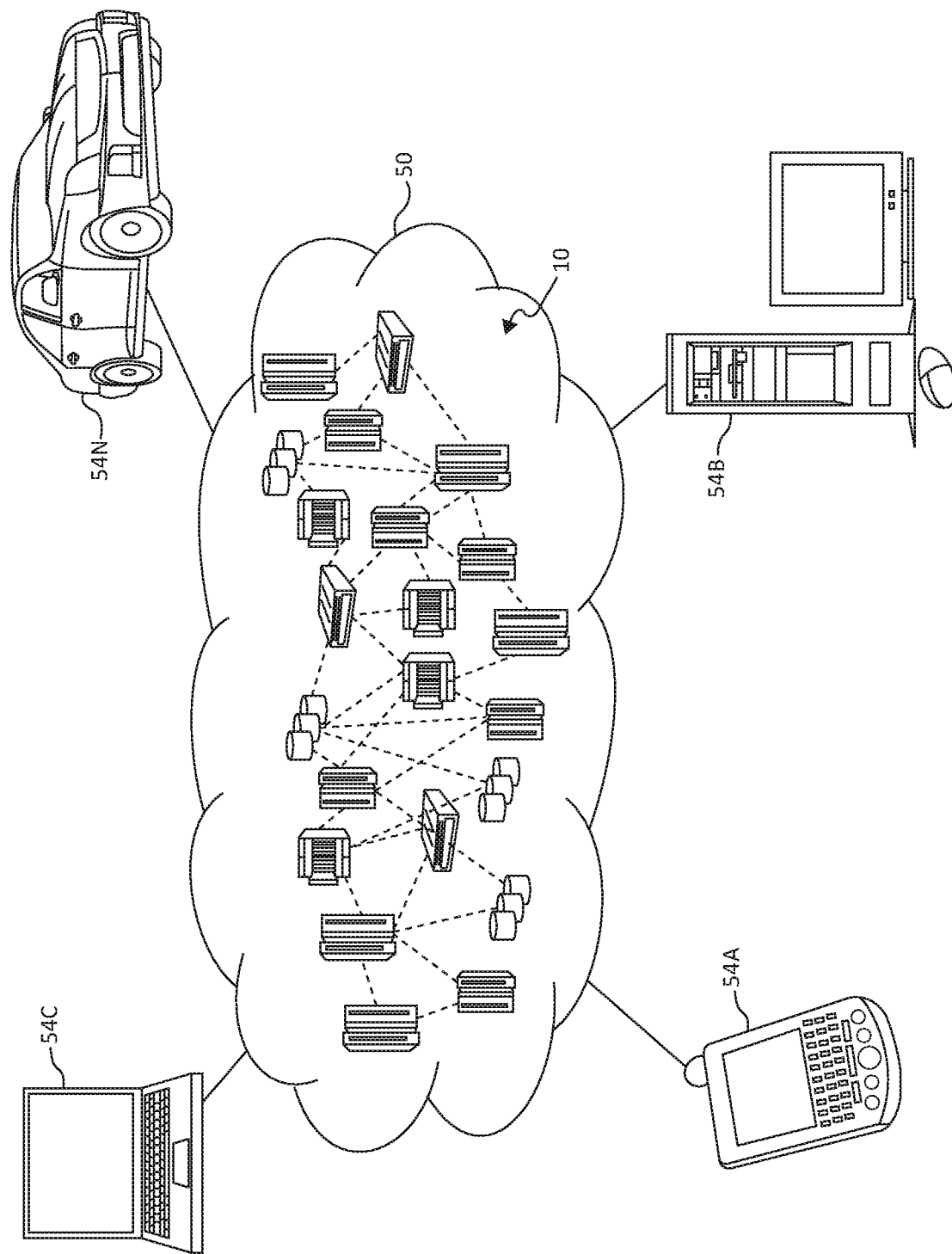
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
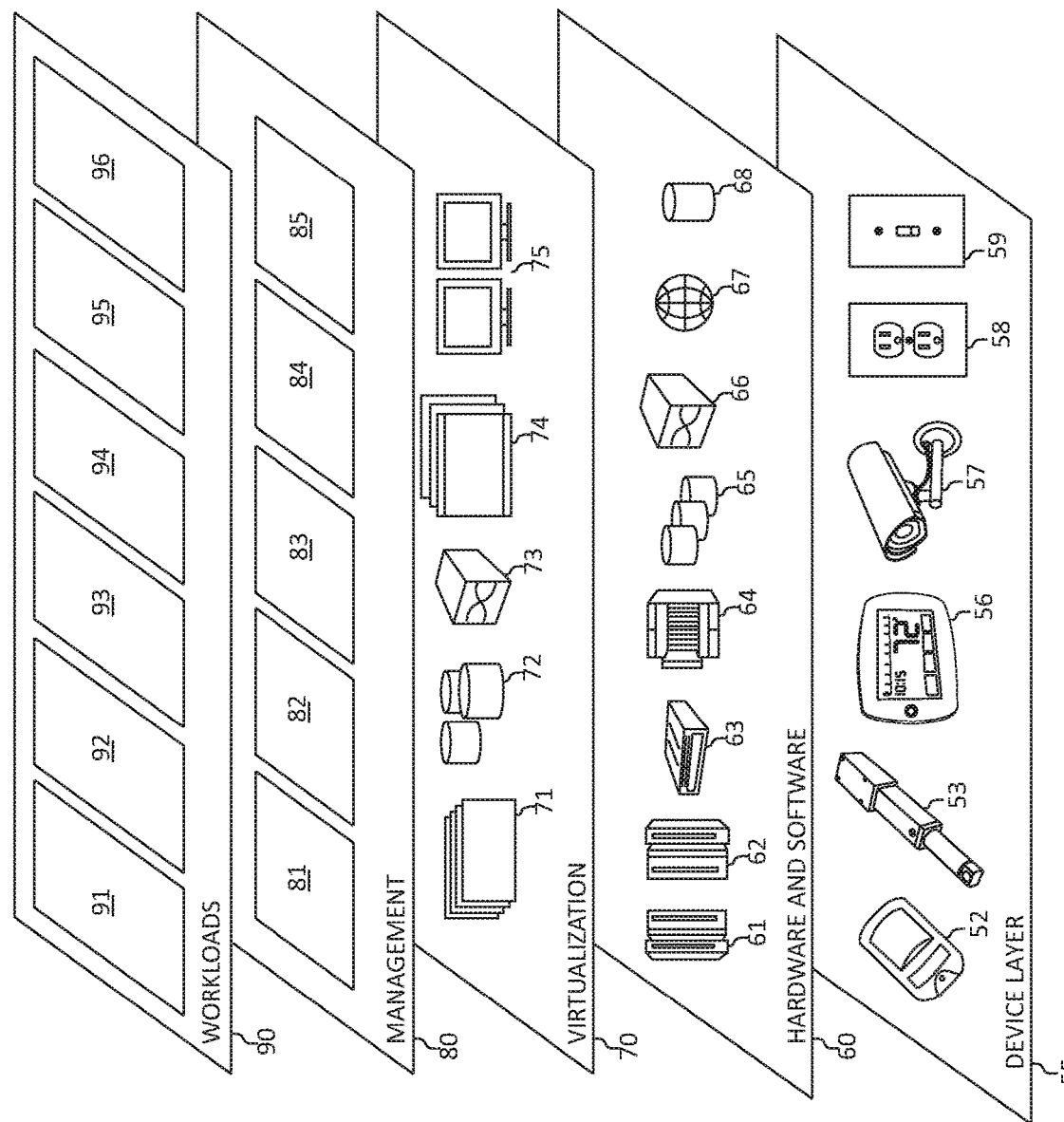
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various learning personalized actionable domain model workloads and functions 96. In addition, learning personalized actionable domain model workloads and functions 96 may include such operations as data analytics, data analysis, and as will be further described, notification functionality. One of ordinary skill in the art will appreciate that the learning personalized actionable domain model workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
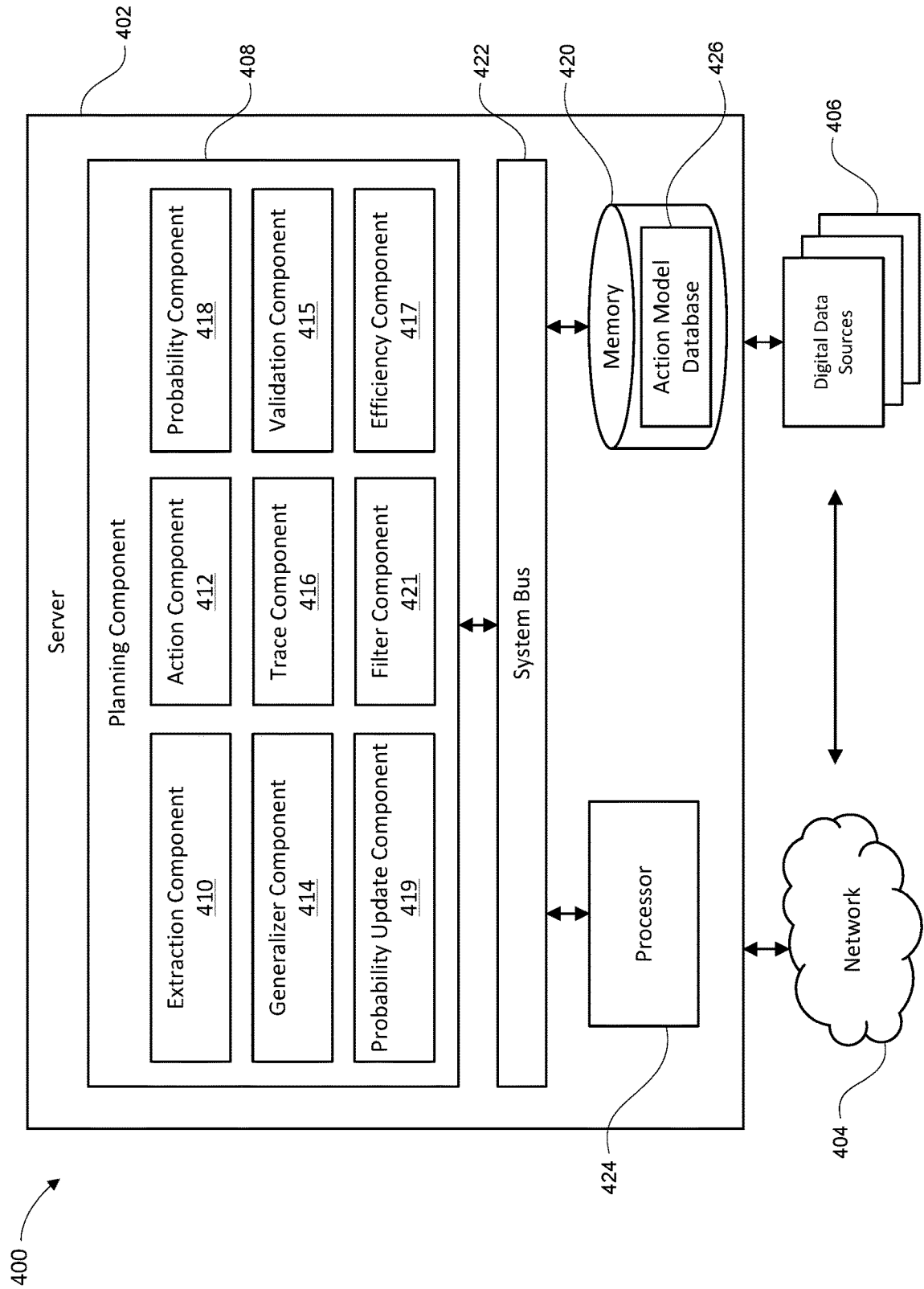
FIG. 4 is an additional block diagram depicting an example, non-limiting system that facilitates autonomously generating a domain model and/or an action model based on unstructured data in accordance with one or more embodiments described herein.

As shown in FIG. 4, the system 400 can include a server 402, one or more networks 404, and one or more digital data sources 406. The server 402 can include planning component 408, which can include extraction component 410, action component 412, generalizer component 414, validation component 415, trace component 416, efficiency component 417, probability component 418, probability update component 419, and a filter component 421. The server 402 can also include or otherwise be associated with at least one memory 420. The server 402 can further include a system bus 422 that can couple the various components including, but not limited to, the planning component 408 and associated components, memory 420 and/or processor 424. While a server 402 is shown in FIG. 4, in other embodiments, any number of different types of devices can be associated with or include the components shown in FIG. 4 as part of the planning component 408. All such embodiments are envisaged.

The planning component 408 can facilitate generating an action model based on unstructured data and a plan based on the action model, wherein the plan can facilitate an increase likelihood of accomplishing a goal. The term "unstructured data" can refer to digital data presented in unrestricted natural language and meant for human consumption. Unstructured data can include, but is not limited to: social media posts and/or commentary, and associated metadata, made by one or more users (e.g., posts made to the FACEBOOK®, TWITTER®, and/or INSTAGRAM® websites and/or mobile applications), social news posts and/or commentary, and associated metadata, (e.g., posts made to the REDDIT® website and/or mobile applications), and/or posts and/or commentary, and associated metadata, on one or more websites which foster discussion (e.g., YOUTUBE® and/or Internet forums). The unstructured data can be generated by one or more entities (e.g., social media users) and can include information contributed to a global corpus (e.g., the Internet and/or a website) in a non-numerical language (e.g., a spoken language) intended for human consumption.

The extraction component 410 can extract unstructured data, which is relevant to one or more goals, from the one or more digital data sources 406. The digital data source 406 can include one or more websites and/or mobile applications where users can submit unstructured data in various forms (e.g., Internet uniform resource locators (URLs) and/or text posts). Also, along with sharing content of the digital data source 406, visitors of the digital data source 406 can comment and vote on unstructured data to establish popularity of rank of the unstructured data in regards to a given topic. Content entries on the digital data source 406 can be designed in a tree format where each branch represents a sub-community. Further, the sub-communities can be categorized to one or more domains, and the domains can regard a variety of topics and/or goals with a variety of specificity. In an embodiment, the extraction component 410 can simultaneously extract unstructured data from a plurality of domains, each relating to the same goal or different goals, of digital data source 406. In another embodiment, the extraction component 410 can simultaneously extract unstructured data from a plurality of digital data sources 406, each relating to the same goal or different goals.

In various embodiments, the extraction component 410 can extract unstructured data from one or more digital data sources 406. The one or more digital data sources 406 can include unstructured data that is accessible to the server 402 either directly or via one or more networks 404 (e.g., an intranet, the Internet, and/or a combination thereof). For example, the one or more digital data sources 406 can include a computer-readable storage device (e.g., a primary storage device, a secondary storage device, a tertiary storage device or an off-line storage device) that can store user-generated data. In another example, the one or more digital data sources 406 can include a community host that includes a website and/or application that facilitates sharing of user-generated data via a network (e.g., the Internet). In some implementations, the extraction component 410 can extract unstructured data that is uploaded to the server 402 by a client device. For example, the website can include a user-generated data source that can access a quantity of shared user-generated data that is uploaded to the website by users of the website. The website can further share this user-generated data to client devices of respective users of the website via the one or more networks 404.

In one or more embodiments, the extraction component 410 can browse the digital data sources 406 for new user-generated data. For example, the extraction component 410 can crawl various websites, applications, and network accessible storage devices for user-generated data that relates to a subject goal and can be utilized to develop an action model. In various embodiments, the extraction component 410 can be or include hardware (e.g., a central processing unit (CPU), a transceiver, a decoder), software (e.g., a set of threads, a set of processes, software in execution) or a combination of hardware and software that facilitates extracting user-generated data from one or more digital data sources 406.

The one or more servers 402, including planning component 408, and the one or more digital data sources 406 can be connected either directly or via one or more networks 404. Such networks 404 can include wired and wireless networks, including, but not limited to, a cellular network, a wide area network (WAN) (e.g., the Internet) or a local area network (LAN). For example, the server 402 can communicate with one or more digital data sources 406 (and vice versa) using virtually any desired wired or wireless technology, including, for example, cellular, WAN, wireless fidelity (Wi-Fi), Wi-Max, WLAN, etc. Further, although in the embodiment shown the planning component 408 is provided on a server device 402, it should be appreciated that the architecture of system 400 is not so limited. For example, the planning component 408 or one or more components of planning component 408 can be located at another device, such as another server device, a client device, etc.

The extraction component 410 can utilize a web crawler (e.g., the Python Reddit API Wrapper (PRAW)) to browse one or more digital data sources 406 for unstructured data that is relevant to a subject goal. The extraction component 410 can browse the digital data sources 406 using a variety of techniques depending on the architecture of the subject digital data source 406, such as searching for domains within the digital data source 406 which are relevant to the subject goal and filtering the unstructured data in any identified domains. The extraction component 410 can search the unstructured data for one or more landmarks that can indicate that the unstructured data relates to the goal (e.g., "tobacco" can be a landmark that indicates that the subject unstructured data relates to the goal of quitting smoking). The extraction component 410 can filter unstructured data from a domain tagged "stop smoking" when the subject goal is to quit smoking. For example, if the goal is to quit smoking, the extraction component 410 can browse a domain tagged "stop smoking" and filter out unstructured data relating to a quitting smoker, such as the social media user's posts and any time stamps associated with the posts. Provided below is a running example of unstructured data (e.g., a social media post) that can be extracted by the extraction component 410 to describe various embodiments of the present invention.

Social Media User 1: "We flew from London to New York on a commercial Airline and then took the subway to statue of liberty and a museum. And horse ride in central Park." Social Media User 2: "We flew Commercial Airlines "X" from City A to City B and then to an Airport in City C. We took a cab to a train station. We took a train to a professional baseball team stadium." Social Media User 3: "You can fly from Airport A to Airport B on Commercial Airlines "X", then take a cab to a city park, then you can take a subway to main street and the ferry to a famous statue."

Once the extraction component 410 identifies and extracts unstructured data relating to the subject goal, the action component 412 can determine one or more actions, and their potential parameters, described in the unstructured data. The action component 412 can extract fragments of the unstructured data to constitute action names and/or action parameters for generating an action model. For example, the action component 412 can utilize a tagger (e.g., Stanford part of speech tagger) to extract verbs and nouns of one or more sentences in the extracted unstructured data. Each extracted verb can be a candidate for an action name. The order of sentences in the unstructured data can be indicative of the order of the extracted actions. Extracted unstructured data can have one or more sentences, and each sentence can have one or more verbs. For example, in the plan trace (i.e. the sequence of actions) one or more action names extracted from a first sentence of the unstructured data can be positioned before one or more action names extracted from a second sentence of the unstructured data.

Additionally, each extracted noun can be a candidate action parameter. Further, the action component 412 can attach an action parameter to an action name based at least on co-occurrence of the action parameter with a given action name in the unstructured data. For example, if there is an action name in the unstructured data that occurs in multiple plan traces and co-occurs with multiple action parameters, the action parameter with the largest co-occurrence frequency with the action name can be chosen by the action component 412 to be the action parameter associated with the action name in an action model. Also, the action component 412 can associate an action parameter with one or more action names. For example, in regards to the running example provided above, action name action parameter associations that can be extracted by the action component 412 can include, but are not limited to: walk, run, plan, trip, look, move, rent, work, cab, fly, train, airport, stadium, visit, attend, boat, horse, park, statue, and travel.

The generalizer component 414 can refine a set of action names extracted by the action component 412 in order to remove redundancies. For example, the generalizer component 414 can apply a hierarchical clustering approach by utilizing a Leacock Chodorow similarity metric (Sim) to measure a distance between any two given action names ($W_i$ and $W_j$). The Leacock Chodorow similarity can be computed, for example, by Equation 1 shown below; wherein Dist($cn_i$, $cn_j$) is the shortest distance between concepts $cn_i$ and $cn_j$ and D is the maximum depth of a taxonomy.

$$\text{Sim}(W_i, W_j) = \text{Max}[\log 2D - \log \text{Dist}(cn_i, cn_j)] \quad (1)$$

Concept can refer to the general topic of a collection. For example, in the sentence "Mary's intelligence impressed her teacher," intelligence can be the concept. Also, the generalizer component 414 can access a wordnet database to measure distance between different concepts and/or action names. Further, an agglomerative approach can be utilized to group semantically similar action names into a cluster. Since the unstructured data can be in the form of a spoken language (e.g., English, Spanish, German, French, Portuguese, Russian, etc.), as opposed to a numerical language, the generalizer component 414 can decide how to compute a distance between any two given clusters. Types of linage metrics that the generalizer component 414 can use to measure the distance metric include, but are not limited to: single linkage metrics, complete linkage metrics, and/or average linkage metrics. For example, the generalizer component 414 can utilize complete linkage metrics, and the agglomerative clustering algorithm can terminate in response to a closeness metric being greater than the complete linkage metric at any given time. The generalizer component 414 can group semantically similar action names, and associated action parameters, into a same cluster in response to termination of the agglomerative clustering algorithm.

Once the action names are clustered, the generalizer component 414 can determine one or more action names that represent a given cluster, known as a cluster representative. The generalizer component 414 can determine the cluster representative using one or more word embedding techniques such as, but not limited to: term frequency—inverse document frequency (TFIDF) techniques, TFIDF based cosine techniques, word to vector techniques, and/or word to vector based cosine techniques. For example, the generalizer component 414 can utilize TFIDF techniques to choose an action name with the highest TFIDF value to be the cluster representative. The generalizer component 414 can utilize Equations 2-4, shown below, to facilitate computing TFIDF values.

$$tf(t, d) = \frac{f_{t,d}}{\max f_{t',d} : t' \in d} \quad (2)$$

$$idf(t, D) = \log \frac{N}{|d \in D : t \in d|} \quad (3)$$

$$tfidf(t, d, D) = tf(t, d) * idf(t, D) \quad (4)$$

The variable t can represent the term and can be a subject action name; variable f can represent a frequency (e.g., frequency of the term (tf)); variable i can represent an inverse (e.g., inverse document frequency (idf)); variable d can be total unstructured data of one user contributing to the global corpus browsed by the extraction component 410; variable N is the total number of unique users that contribute to the extracted unstructured data; and variable D can be the total unstructured data extracted by the extraction component 410. Thus, the generalizer component 414 can generate one or more clusters and designate one or more action names as the cluster representative. Also, the generalizer component 414 can map extracted action names to the cluster representative of their respective cluster. For example, in regards to the running example provided above, action names mapped to cluster representatives by the generalizer component 414 can include, but is not limited to: "spent" mapped to "spend", "fly" mapped to "airport", and/or "take" mapped to "taken."

The trace component 416 can turn initial plan fragments into plan traces. Initial plan fragments can include the action names (i.e. initial action names) and associated action parameters (i.e. initial action parameters) determined by the action component 412 prior to the clustering performed by the generalizer component 414. The trace component 416 can replace an initial action name and/or associate initial action parameter with the cluster representative for the subject initial action name's respective cluster and an action parameter associated with the cluster representative. Further, the trace component 416 can replace two or more sequential initial action names of the same cluster with the cluster representative of the subject cluster. For example, if an initial plan fragment includes the action name (a) sequence: [$a_1, a_2, a_2, a_4, a_5$] (wherein each sub-numeral (e.g., 1, 2, 4, and 5) can denote a respective cluster (e.g., cluster 1, cluster 2, cluster 4, and cluster 5)), the trace component 416 can replace the initial plan fragment with the cluster representative (c) sequence: [$c_1, c_2, c_4, c_5$] to form a plan trace. One or more of the plan traces generated by the trace component 416 can comprise a domain model for the subject goal.

The probability component 418 can extract action preconditions and action effects for each action name included in a plan trace. Due to at least co-occurrence in the plan traces, action names can be inter-related with other action names with a probability ($p_{i,j}$) describing a chance of a cluster representative $c_j$ following another cluster representative $c_i$. For example, the probability component 418 can consider a constraint metric (e.g., a sequence probability threshold) to decide whether a co-occurring relationship can be considered in formation of an action model.

The probability ($p_{i,j}$) can be computed through data-driven techniques. For example, $c_1$ and $c_2$ can be two actions where $c_1$ is an effect of $c_2$. In which case, unless $c_2$ is executed, $c_1$ cannot be executed. The probability component 418 can utilize Equation 5, presented below, wherein $c_1$ can be a post-condition of $c_2$ if $p(c_1|c_2)$ is greater than a probability metric, and $c_2$ can be a pre-condition of $c_1$. The ∩ in Equation 5 can represent an ordered conjunction that considers the sequentially of $c_1$ and $c_2$.

$$p(c_1 | c_2) = \frac{p(c1 \cap c2)}{P(C2)}. \quad (5)$$

Figure 5:
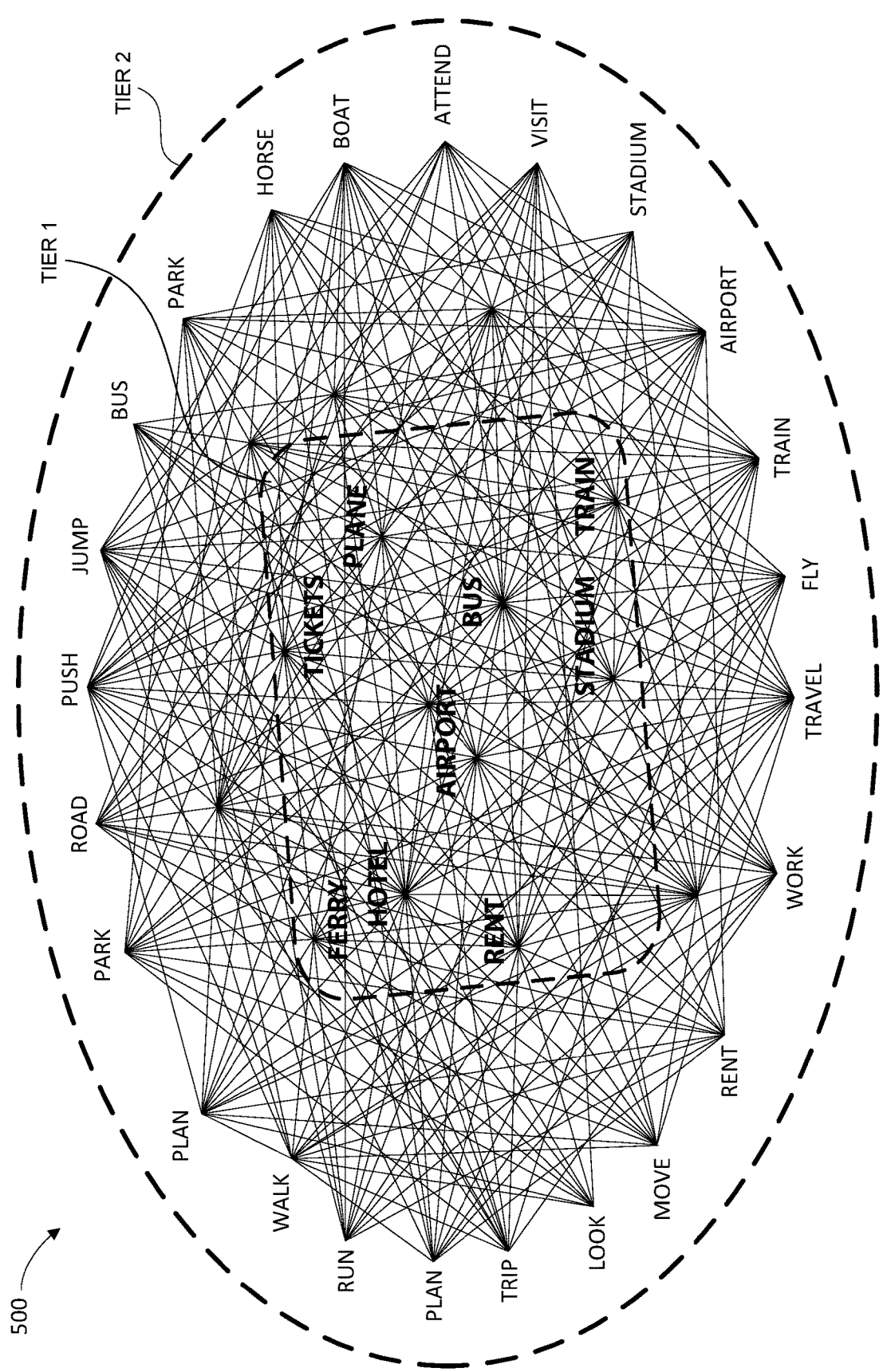
FIG. 5 is an additional block diagram depicting an example, non-limiting action precedence graph in accordance with one or more embodiments described herein.

In various embodiments, the probability component 418 can determine probabilities that establish a relationship between different action names in a set of plan traces. Also, the probability component 418 can generate an action model represented as a precedence graph that illustrates actions (e.g., cluster representatives) and the transitions between different actions that are associated with weights. For example, a precedence graph can illustrate the plan traces (e.g., sequence of actions) determined by the trace component 416 along with the associate probabilities determined by the probability component 418. FIG. 5 illustrates an example, non-limiting, action precedence graph 500 that can be generated by the probability component 418 regarding the running example "Traveling Plan" domain. Repetitive description of like elements employed in other embodiments described herein is omitted for sake of brevity. Specifically, FIG. 5 depicts a social media distance in social media networks between each one of the plurality of cluster representatives, wherein the one or more online data sources include the social media networks. As illustrated, those of the plurality of cluster representatives may be divided into a first tier ("Tier 1") having the social media distance less than a defined social media distance threshold to the one of the plurality of cluster representatives. Those of the plurality of cluster representatives may be divided into a second tier ("Tier 2") having the social media distance greater than a defined social media distance threshold to the one of the plurality of cluster representatives. As depicted in FIG. 5 for illustrative purposes only, Tier 1 may be those cluster representatives designated within the square box formed with dashed-lines, while Tier 2 may be those cluster representatives outside the square box formed with dashed-lines and within the circle with dashed-lines.

Referring again to FIG. 4, one or more action models generated by the probability component 418 can be kept in the memory 420 via an action model database 426. The probability update component 419 may be used in association with the probability component 418. The probability update component 419 may update a hierarchical model with probabilities of an action model consisting of preconditions and effects and domain models consisting of predicates and their probabilities may be built (created/generated) from the extracted plan traces. The probability update component 419 may assign weighted values to social data of a plurality of other social media users based on a social distance to a social media user. The probability update component 419 may update the probabilities of the hierarchical model with preferences and weighted values of the other social media users in a user's social network. For example, an update method to personalize the top-N hierarchical models for a person may be as follows. For a person, recursively find a defined top-N action model for all persons in that person's "near" group, that have not been explored earlier, wherein "N" may be a selected number or a positive integer. Eventually, the probability update component 419 may find persons with no unexplored near neighbors and returns their top-N actions. If a person receives more than N actions from their near neighbors, the probability update component 419 may consider the top-N actions for scaling such as, for example, by scaling (e.g., increase by 50% factor) the probabilities for extracted actions that are in a person's "near" group and/or decreasing probabilities proportionally ensuring the probabilities add to 1 for the rest of actions.

The filter component 421 may filter a hierarchical model to produce an Nth subset of abstracted actions based on the weighted actions, wherein N is a positive integer. That is, filter component 421 may filter a hierarchical model to a subset of best/top-N set of abstract tasks/actions. Any other identified actions may be grouped together as a "remaining set" of tasks/actions. That is, the set of remaining tasks/actions may be pooled as a set. The probability of set of remaining tasks/actions may be marked as 1 minus the sum of the probability of the top/best (N−1) tasks/actions.

The validation component 415 may verify the model with one or more types of planners (e.g., HTN, probabilistic HTN), where N may be a predetermined value or positive integer. The validation component 415 may also measure a quality of the action model generated by the probability component 418. One or more nodes of the action precedence graph (e.g., the action model) can represent an action name (e.g., a cluster representative) and one or more edges can be an action transition between two or more action names. Also, the support-based probability ($p_{i,j}$) can be an edge weight between two or more nodes. An action transition with the highest edge weight can be the primary path of the action model. The validation component 415 can determine a metric, hereinafter referred to as "explainability," that is indicative of the quality of the action model.

The validation component 415 can divide the extracted unstructured data into one or more training datasets and one or more testing datasets. One or more training datasets can be utilized to build the action model, whereas one or more testing datasets can be utilized to validate the action model. For example, the validation component 415 can utilize Equations 6 and 7, shown below, where T can be a set of transitions between actions present in the action model and T' can be a set of transitions between actions present in a test dataset. The explainability value can be expressed as a percentage and represent the number of action and/or action sequences that can be explained (e.g. correlated) by the subject action model.

$$T'' = T \cap T' \qquad (6)$$

$$\text{Explainability} = \frac{|T''|}{|T'|} \qquad (7)$$

Another way to validate by the validation component 415 is by using a planner system, such as, for example, simple hierarchical ordered planner ("SHOP2"). The planner may be run to determine and/or measure the performance and the cost of the return results.

The efficiency component 417 that can measure the efficiency of an action model. Repetitive description of like elements employed in other embodiments described herein is omitted for sake of brevity. The efficiency component 417 can determine one or more of the shortest paths from a given source node in the action model to a goal node. For example, in the running example Travel Plan domain, the source node can be start_travel and the goal node can be schedule_travel. The efficiency component 417 can utilize one or more algorithms, such as Djikstra's shortest path algorithm, to determine a shortest route by satisfying one or more given constraints. Also, the efficiency component 417 can employ the NetworkX Python library.

Figure 6:
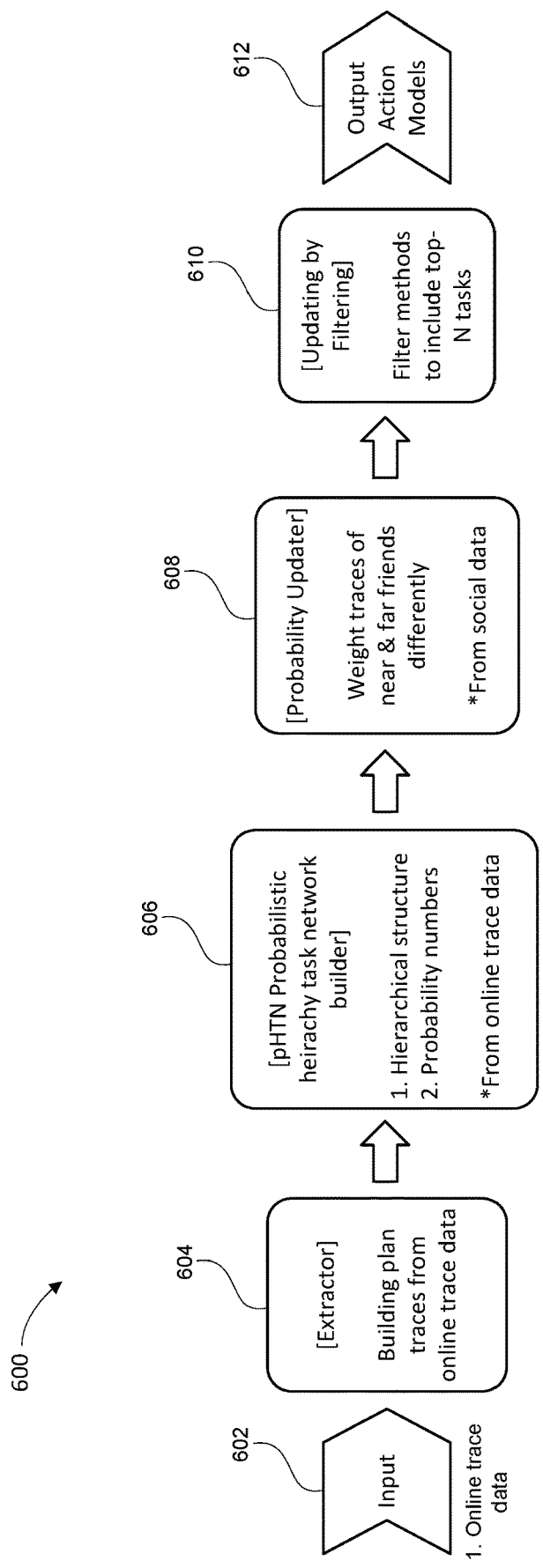
FIG. 6 is an additional block diagram depicting an exemplary functional relationship between various components for learning personalized actionable domain models from online traces and social networks in accordance with one or more embodiments described herein.

As previously mentioned, the mechanisms of the illustrated embodiments provide novel approaches to learning personalized actionable domain models from online traces and social networks. Turning now to FIG. 6, a flow diagram 600 depicting an exemplary functional relationship between various components for learning personalized actionable domain models from online traces and social networks is depicted. In one aspect, each of the devices, components, modules, and/or functions described in FIGS. 1-5 also may apply to the devices, components, modules, and functions of FIG. 6. Also, one or more of the operations and steps of FIGS. 1-5 may be included in one or more operations or actions of FIG. 6. The flow diagram 600 may start with input data being extracted from one or more online data sources such as, for example, online trace data and/or data of social media, as in block 602. In block 604, an extractor component may build plan traces from online trace data. A pHTN builder may build a hierarchal structure with probabilities of an action model and probability values/numbers from the online trace data, as in block 606. The probability updater may assign different weights to traces of social media data or social media actions/activities of users that may be common or similar (e.g., "near" users) and dissimilar users (e.g., "far" users), as in block 608. A filtering component may filter the hierarchal structure to a set of best/top-N set of abstract tasks/actions, where N may be a predetermined value or positive integer, as in block 610. An output may be one or more actionable domain models, as in block 612. That is, the output may be a learned, personalized actionable domain model.

In view of the foregoing, the mechanisms of the illustrated embodiments provide, among other aspects, a hierarchal structure with probabilities of the action model and the probabilities of the hierarchical model may be updated with social data of a person. The extracted hierarchical model may be verified.

Consider now the following example of various rules depicted in pseudocode. Again, using the example above for considering a travel domain where various users share travel-related plans online via one or more social media networks. Social Media User 1: "We flew from City A to City B on a commercial Airline and then took the subway to statue of liberty and a museum. And horse ride in central Park." Social Media User 2: "Fly Commercial Airlines "X" from City A to Airport B in City B. Take a cab to a train station. Take a train to a professional baseball team stadium." Social Media User 3: "Fly from Airport A to Airport B on Commercial Airlines "X" to City B, take a cab to a city park, then you can take a subway to main street and the ferry to a famous statue."

Step 1: Extract plan traces from social media data/posts of each user (e.g., social media users 1-3):

```
(define (domain social media users 2-3 travel to City B)
    (:requirements ...)
    (:predicates ...)
    (:actions ... )
    (:action fly__ Commerical Airlines "X"__Airport B
        [: prob xx]
        [:parameters (CommericalAirlines_X... )... ]
        [:effect (in__City B)..) ...])))
    (:action HIER-A1
        [: prob yy]
        [:method subway
            (:action ...)]
```

Step 2: Divide each social media user into similar ("near") social media users and dissimilar ("far") social media users based on the social media network(s). For example, Social Media User 1 and Social Media User 2 are near and Social Media User 3 is far from Social Media Users 1 and 2.

Step 3:

```
{ (:action HIER-A1
    [: prob yy]
    [:method subway
        (:action ...)]
    [:method (cab....]
        (:action ...)]
    [:method (Remaining ....]
        (:action ...)]
```

Figure 7:
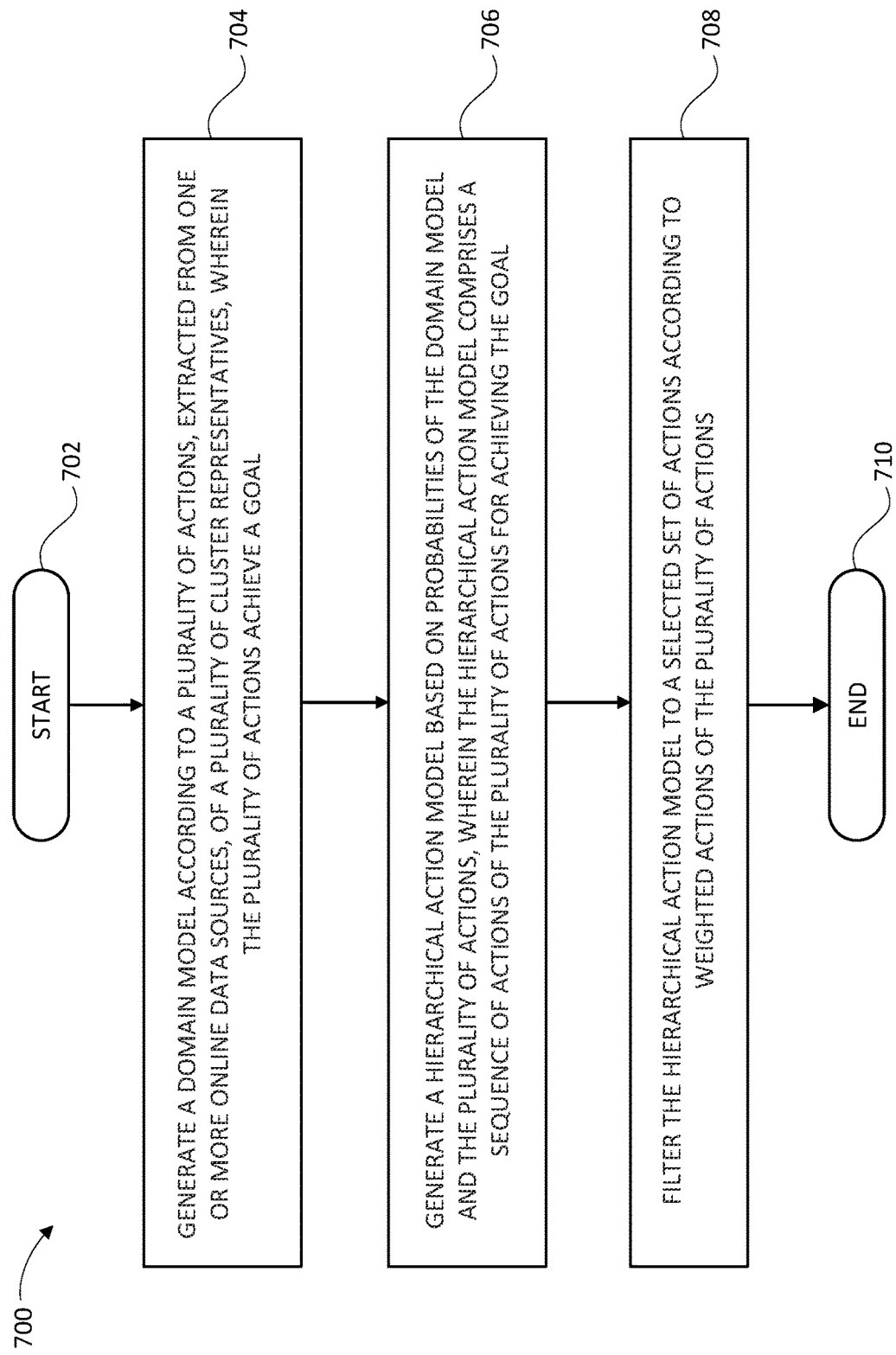
FIG. 7 is an additional flowchart diagram depicting an additional exemplary method for learning personalized actionable domain models by one or more processors, again in which aspects of the present invention may be realized.

Turning now to FIG. 7, a method 700 for learning personalized actionable domain models by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. A domain model may be generated according to a plurality of actions, extracted from one or more online data sources, of a plurality of cluster representatives, wherein the plurality of actions achieve a goal, as in block 704. A hierarchical action model may be generated based on probabilities of the domain model and the plurality of actions, as in block 706. The hierarchical action model comprises a sequence of actions of the plurality of actions for achieving the goal. The hierarchical action model may be filtered to a selected set of actions according to weighted actions of the plurality of actions, as in block 708. The functionality 700 may end, as in block 710.

Figure 8:
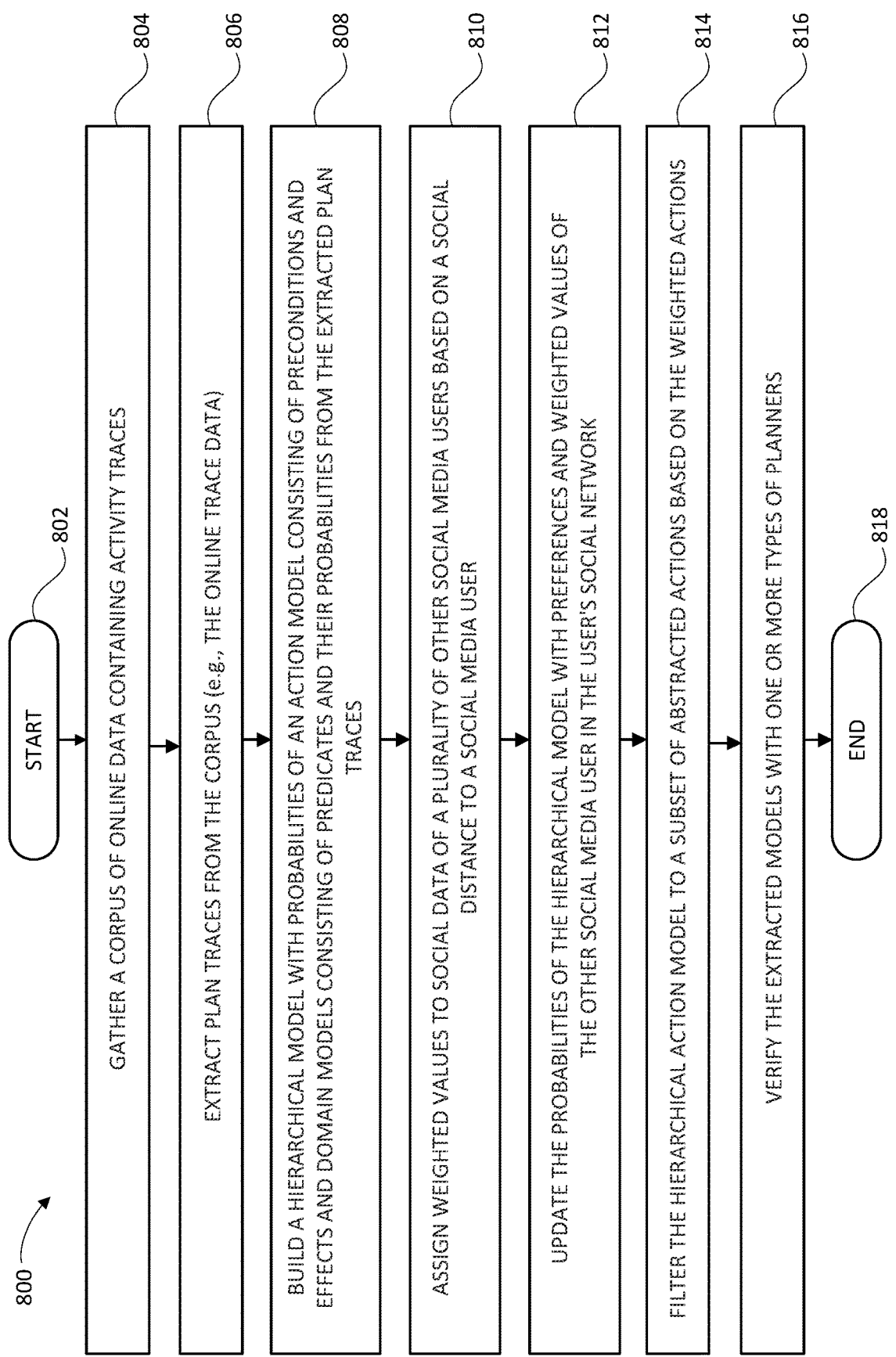
FIG. 8 is an additional flowchart diagram depicting an additional exemplary method for earning personalized actionable domain models from online traces and social networks by a processor, again in which aspects of the present invention may be realized.

Turning now to FIG. 8, a method 800 for learning personalized actionable domain models by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802. A corpus of online data containing activity traces may be gathered/collected, as in block 804. One or more plan traces may be extracted from the corpus (e.g., the online trace data), as in block 806. A hierarchical model with probabilities of an action model consisting of preconditions and effects and domain models consisting of predicates and their probabilities may be built (created/generated) from the extracted plan traces, as in block 808. Weighted values may be assigned to social data of a plurality of other social media users based on a social distance to a social media user, as in block 810. The probabilities of the hierarchical model may be updated with preferences and weighted values of the other social media user in the users social network, as in block 812. The hierarchical model may be filtered to produce an Nth subset of abstracted actions based on the weighted actions, wherein N is a positive integer, as in block 814. The extracted hierarchical model may be verified with one or more types of planners, as in block 816. The functionality 800 may end, as in block 818.

In one aspect, in conjunction with and/or as part of at least one block of FIGS. 7 and 8, the operations of methods 700 and 800 may include each of the following. The operations of methods 700 and 800 may generate the domain model by grouping one or more actions from the plurality of actions into a cluster based on similarity of the plurality of cluster representatives. Semantic text of the one or more online data sources may be analyzed using text analysis. The plurality of actions may be extracted from the analyzed semantic text of the one or more online data sources.

The methods 700 and 800 may determine a social media distance in social media networks between each one of the plurality of cluster representatives, wherein the one or more online data sources include the social media networks. The methods 700 and 800 may assign a weighted value to the plurality of actions according to the social media distance of each one of the plurality of cluster representatives. The methods 700 and 800 may divide those of the plurality of cluster representatives into a first tier having the social media distance less than a defined social media distance threshold to the one of the plurality of cluster representatives, divide those of the plurality of cluster representatives into a second tier having the social media distance greater than a defined social media distance threshold to the one of the plurality of cluster representatives, and/or rank the weighted actions of the plurality of actions of those in the first tier greater than the weighted actions of the plurality of actions of those in the second tier.

A plurality of preferences in social media networks and the plurality of actions relating to each one of the plurality of cluster representatives may be learned, such as by using a machine learning model/mechanism. The methods 700 and 800 may update probabilities of the hierarchical action model according to the plurality of preferences in social media networks and the plurality of actions.

The methods 700 and 800 may determine a quality of the hierarchical action model and determine an efficiency of the hierarchical action model, wherein the hierarchical action model is probabilistic.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for learning personalized actionable domain models by a processor, comprising:
   generating a domain model according to data representative of a plurality of actions, extracted from one or more online data sources, of a plurality of cluster representatives, wherein the plurality of actions achieve a goal;
   dividing the data extracted from the one or more online data sources into one or more training datasets and one or more testing datasets;
   training, in a machine learning operation, a hierarchical action model using the one or more training datasets, wherein the training includes identifying probabilities of relationships established between those of the plurality of actions that are interdependent and transitions between those of the plurality of actions;
   generating the hierarchical action model based on the probabilities of the domain model and the plurality of actions, wherein the hierarchical action model comprises a sequence of actions of the plurality of actions for achieving the goal;
   filtering the hierarchical action model to a selected set of actions according to weighted actions of the plurality of actions; and
   validating the filtered hierarchical action model, in the machine learning operation, using the one or more testing datasets.

2. The method of claim 1, wherein the generating the domain model further includes grouping one or more actions from the plurality of actions into a cluster based on similarity of the plurality of cluster representatives.

3. The method of claim 1, further including:
   analyzing semantic text of the one or more online data sources using text analysis; and
   extracting the plurality of actions from the analyzed semantic text of the one or more online data sources.

4. The method of claim 1, further including determining a social media distance in social media networks between each one of the plurality of cluster representatives, wherein the one or more online data sources include the social media networks.

5. The method of claim 4, further including assigning a weighted value to the plurality of actions according to the social media distance of each one of the plurality of cluster representatives.

6. The method of claim 4, further including:
   dividing those of the plurality of cluster representatives into a first tier having the social media distance less than a defined social media distance threshold to the one of the plurality of cluster representatives;
   dividing those of the plurality of cluster representatives into a second tier having the social media distance greater than a defined social media distance threshold to the one of the plurality of cluster representatives; and
   ranking the weighted actions of the plurality of actions of those in the first tier greater than the weighted actions of the plurality of actions of those in the second tier.

7. The method of claim 1, further including:
   learning a plurality of preferences in social media networks and the plurality of actions relating to each one of the plurality of cluster representatives; and
   updating probabilities of the hierarchical action model according to the plurality of preferences in social media networks and the plurality of actions.

8. The method of claim 1, further including:
   determining a quality of the hierarchical action model; and
   determining an efficiency of the hierarchical action model, wherein the hierarchical action model is probabilistic.

9. A system for learning actionable domain models, comprising:
   one or more computers with executable instructions that when executed cause the system to:
      generate a domain model according to data representative of a plurality of actions, extracted from one or more online data sources, of a plurality of cluster representatives, wherein the plurality of actions achieve a goal;
      divide the data extracted from the one or more online data sources into one or more training datasets and one or more testing datasets;
      train, in a machine learning operation, a hierarchical action model using the one or more training datasets, wherein the training includes identifying probabilities of relationships established between those of the plurality of actions that are interdependent and transitions between those of the plurality of actions;
      generate the hierarchical action model based on the probabilities of the domain model and the plurality of actions, wherein the hierarchical action model comprises a sequence of actions of the plurality of actions for achieving the goal;
      filter the hierarchical action model to a selected set of actions according to weighted actions of the plurality of actions; and
      validate the filtered hierarchical action model, in the machine learning operation, using the one or more testing datasets.

10. The system of claim 9, wherein the generating the domain model further includes grouping one or more actions from the plurality of actions into a cluster based on similarity of the plurality of cluster representatives.

11. The system of claim 9, wherein the executable instructions:
   analyze semantic text of the one or more online data sources using text analysis; and
   extract the plurality of actions from the analyzed semantic text of the one or more online data sources.

12. The system of claim 9, wherein the executable instructions determine a social media distance in social media networks between each one of the plurality of cluster representatives, wherein the one or more online data sources include the social media networks.

13. The system of claim 12, wherein the executable instructions assign a weighted value to the plurality of actions according to the social media distance of each one of the plurality of cluster representatives.

14. The system of claim 12, wherein the executable instructions:
   divide those of the plurality of cluster representatives into a first tier having the social media distance less than a defined social media distance threshold to the one of the plurality of cluster representatives;

divide those of the plurality of cluster representatives into a second tier having the social media distance greater than a defined social media distance threshold to the one of the plurality of cluster representatives; and rank the weighted actions of the plurality of actions of those in the first tier greater than the weighted actions of the plurality of actions of those in the second tier.

15. The system of claim 9, wherein the executable instructions:

learn a plurality of preferences in social media networks and the plurality of actions relating to each one of the plurality of cluster representatives;

update probabilities of the hierarchical action model according to the plurality of preferences in social media networks and the plurality of actions;

determine a quality of the hierarchical action model; and determine an efficiency of the hierarchical action model, wherein the hierarchical action model is probabilistic.

16. A computer program product for, by a processor, learning actionable domain models, the computer program product comprising a non-transitory computer-readable storage medium having computer-readable program code portions stored therein, the computer-readable program code portions comprising:

an executable portion that generates a domain model according to data representative of a plurality of actions, extracted from one or more online data sources, of a plurality of cluster representatives, wherein the plurality of actions achieve a goal;

an executable portion that divides the data extracted from the one or more online data sources into one or more training datasets and one or more testing datasets;

an executable portion that trains, in a machine learning operation, a hierarchical action model using the one or more training datasets, wherein the training includes identifying probabilities of relationships established between those of the plurality of actions that are interdependent and transitions between those of the plurality of actions;

an executable portion that generates the hierarchical action model based on the probabilities of the domain model and the plurality of actions, wherein the hierarchical action model comprises a sequence of actions of the plurality of actions for achieving the goal;

an executable portion that filters the hierarchical action model to a selected set of actions according to weighted actions of the plurality of actions; and an executable portion that validates the filtered hierarchical action model, in the machine learning operation, using the one or more testing datasets.

17. The computer program product of claim 16, wherein the generating the domain model further includes grouping one or more actions from the plurality of actions into a cluster based on similarity of the plurality of cluster representatives.

18. The computer program product of claim 16, further including an executable portion that:

analyzes semantic text of the one or more online data sources using text analysis; and extracts the plurality of actions from the analyzed semantic text of the one or more online data sources.

19. The computer program product of claim 16, further including an executable portion that:

determines a social media distance in social media networks between each one of the plurality of cluster representatives, wherein the one or more online data sources include the social media networks;

assigns a weighted value to the plurality of actions according to the social media distance of each one of the plurality of cluster representatives;

divides those of the plurality of cluster representatives into a first tier having the social media distance less than a defined social media distance threshold to the one of the plurality of cluster representatives;

divides those of the plurality of cluster representatives into a second tier having the social media distance greater than a defined social media distance threshold to the one of the plurality of cluster representatives; and ranks the weighted actions of the plurality of actions of those in the first tier greater than the weighted actions of the plurality of actions of those in the second tier.

20. The computer program product of claim 16, further including an executable portion that:

learns a plurality of preferences in social media networks and the plurality of actions relating to each one of the plurality of cluster representatives;

updates probabilities of the hierarchical action model according to the plurality of preferences in social media networks and the plurality of actions;

determines a quality of the hierarchical action model; and determines an efficiency of the hierarchical action model, wherein the hierarchical action model is probabilistic.

* * * * *